(12) United States Patent
Okuno et al.

(10) Patent No.: US 9,147,412 B2
(45) Date of Patent: Sep. 29, 2015

(54) HEAD GIMBAL ASSEMBLY

(71) Applicant: NITTO DENKO CORPORATION, Osaka (JP)

(72) Inventors: Tomoaki Okuno, Osaka (JP); Hiroyuki Tanabe, Osaka (JP); Yoshito Fujimura, Osaka (JP); Naohiro Terada, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/580,850

(22) Filed: Dec. 23, 2014

(65) Prior Publication Data

US 2015/0179196 A1 Jun. 25, 2015

(30) Foreign Application Priority Data

Dec. 25, 2013 (JP) .................................. 2013-267852

(51) Int. Cl.
G11B 21/24 (2006.01)
G11B 5/48 (2006.01)

(52) U.S. Cl.
CPC .............. G11B 5/4826 (2013.01); G11B 21/24 (2013.01)

(58) Field of Classification Search
CPC .............. G11B 21/24; G11B 5/56; G11B 5/48
USPC ........................................... 360/294.4, 294.3
See application file for complete search history.

(56) References Cited

U.S. PATENT DOCUMENTS

| | | | | |
|---|---|---|---|---|
| 6,157,522 A * | 12/2000 | Murphy et al. | ............. | 360/294.6 |
| 6,376,964 B1 * | 4/2002 | Young et al. | ................... | 310/311 |
| 7,375,911 B1 * | 5/2008 | Li et al. | ............................ | 360/75 |
| 8,526,142 B1 * | 9/2013 | Dejkoonmak et al. | ..... | 360/294.4 |
| 2002/0048124 A1 * | 4/2002 | Kuwajima et al. | ......... | 360/294.4 |
| 2003/0223155 A1 * | 12/2003 | Uchiyama | ................... | 360/294.4 |
| 2004/0135472 A1 * | 7/2004 | Kita et al. | ...................... | 310/328 |
| 2004/0136117 A1 * | 7/2004 | Kuwajima et al. | ......... | 360/294.4 |
| 2005/0047024 A1 * | 3/2005 | Yamazaki et al. | ......... | 360/294.4 |
| 2005/0195531 A1 * | 9/2005 | Yamazaki et al. | ......... | 360/294.4 |
| 2009/0195938 A1 * | 8/2009 | Yao et al. | ................... | 360/294.4 |
| 2009/0284871 A1 * | 11/2009 | Yao | ........................... | 360/294.4 |
| 2010/0195251 A1 * | 8/2010 | Nojima et al. | ............. | 360/245.3 |
| 2010/0195252 A1 * | 8/2010 | Kashima | .................... | 360/294.4 |
| 2011/0096438 A1 * | 4/2011 | Takada et al. | ............. | 360/244.2 |
| 2011/0149440 A1 * | 6/2011 | Uematsu et al. | ........... | 360/245.3 |
| 2012/0002366 A1 * | 1/2012 | Ohnuki et al. | ........... | 361/679.33 |
| 2012/0247824 A1 * | 10/2012 | Ohsawa | ........................ | 174/264 |
| 2013/0020112 A1 | 1/2013 | Ohsawa | | |

(Continued)

FOREIGN PATENT DOCUMENTS

JP 2013-062012 A 4/2013

*Primary Examiner* — Allen T Cao

(74) *Attorney, Agent, or Firm* — Jean C. Edwards, Esq.; Edwards Neils PLLC

(57) ABSTRACT

A head gimbal assembly includes a suspension board with circuit, a pair of piezoelectric elements mounted on the suspension board with circuit to be expandable/contractible, and a slider on which a magnetic head is mounted and which is mounted on the suspension board with circuit and configured to be able to swing with expansion/contraction of the pair of piezoelectric elements. The pair of piezoelectric elements are placed on the suspension board with circuit such that a first imaginary line extending along an expanding/contracting direction of one of the piezoelectric elements crosses a second imaginary line extending along an expanding/contracting direction of the other piezoelectric element.

7 Claims, 7 Drawing Sheets

(56) References Cited

U.S. PATENT DOCUMENTS

| | | | |
|---|---|---|---|
| 2013/0133939 A1* | 5/2013 | Ishii | 174/262 |
| 2013/0248233 A1* | 9/2013 | Kanezaki et al. | 174/260 |
| 2013/0319743 A1* | 12/2013 | Ishii et al. | 174/260 |

* cited by examiner

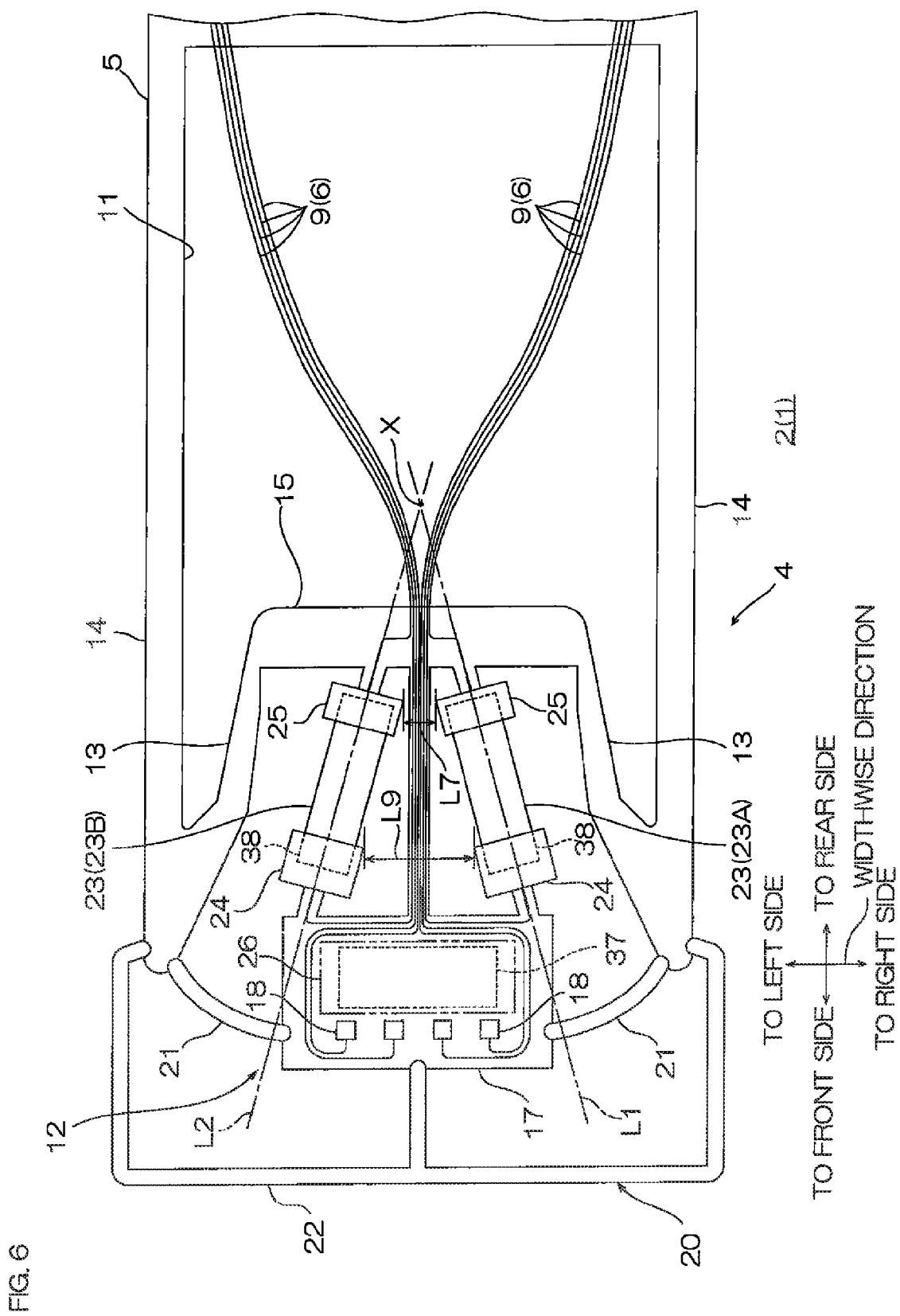

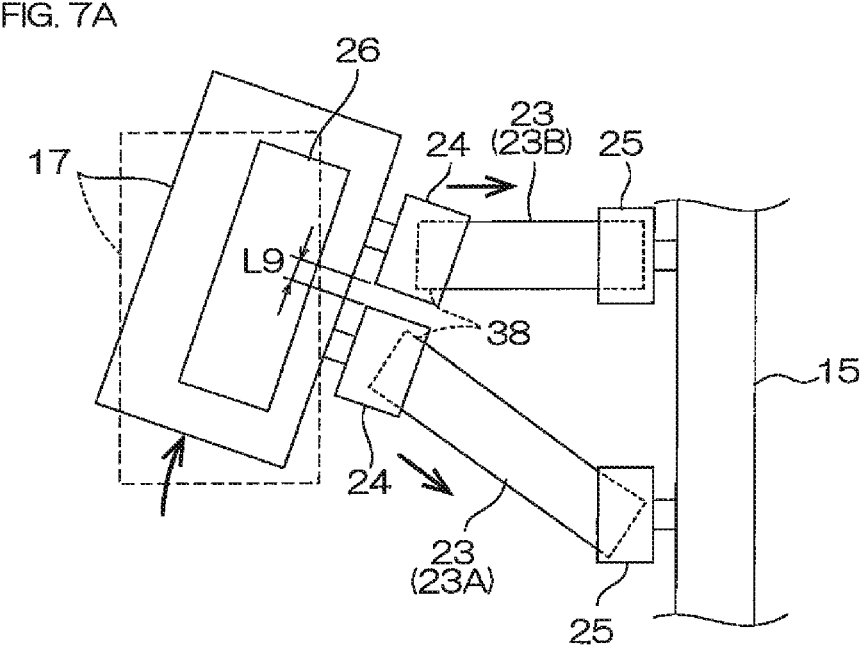
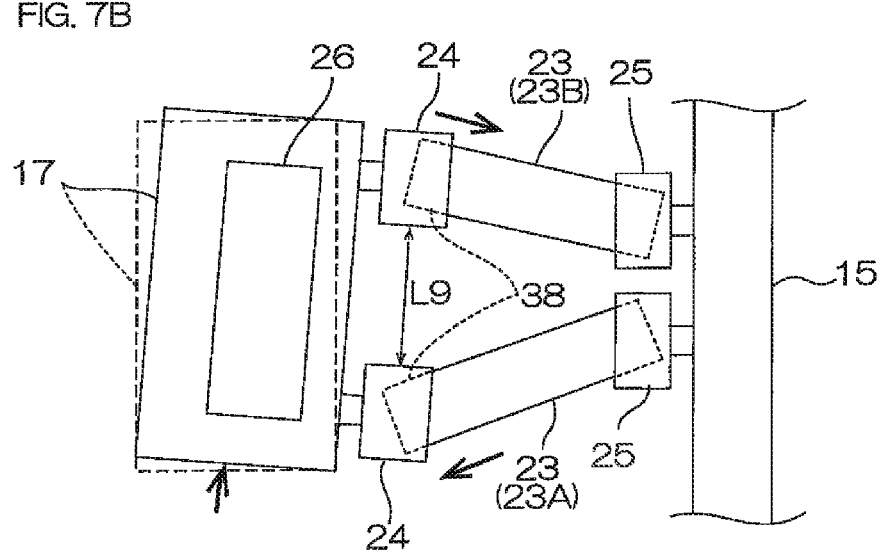

HEAD GIMBAL ASSEMBLY

CROSS-REFERENCE TO RELATED APPLICATION

The present application claims priority from Japanese Patent Application No. 2013-267852 filed on Dec. 25, 2013, the content of which is herein incorporated by reference into this application.

BACKGROUND OF THE INVENTION

1. Field of the Invention

The present invention relates to a head gimbal assembly, and particularly to a head gimbal assembly used in a hard disk drive.

2. Description of the Related Art

Conventionally, a head gimbal assembly has been known in which various electronic elements are mounted on a suspension board with circuit. Specific examples of such electronic elements include a slider on which a magnetic head is mounted, and a piezo-element (piezoelectric element). In such a head gimbal assembly, the position of a slider is adjusted using the expansion/contraction of the piezo-element to improve the accuracy of read/write operations performed by a magnetic head.

For example, a head gimbal assembly is proposed in which, on the gimbal portion of a suspension board with circuit, a slider and a pair of piezo-elements are mounted (see, e.g., Japanese Unexamined Patent No. 2013-062012). In the head gimbal assembly described in Patent Document 1, the pair of piezo-elements are each arranged in parallel along the longitudinal direction of the suspension board with circuit. Specifically, a base portion and a stage on which the slider is mounted are placed to be spaced apart from each other in the longitudinal direction, and each of the pair of piezo-elements is placed over and between the base portion and the stage. By contracting one of the piezo-elements and expanding the other piezo-element, the stage and the slider are allowed to swing in a widthwise direction.

SUMMARY OF THE INVENTION

In recent years, there has been a demand to largely move a slider in a widthwise direction on the basis of the expansion/contraction of piezo-elements and thus largely adjust the position of a magnetic head. However, in the head gimbal assembly described in Japanese Unexamined Patent No. 2013-062012, the pair of piezo-elements are arranged in parallel. As a result, a problem arises in that the foregoing demand cannot be met.

It is therefore an object of the present invention to provide a head gimbal assembly which allows a slider to largely move to be able to largely adjust the position of a magnetic head.

A head gimbal assembly of the present invention includes a suspension board with circuit, a pair of piezoelectric elements mounted on the suspension board with circuit to be expandable/contractible, and a slider on which a magnetic head is mounted and which is mounted on the suspension board with circuit and configured to be able to swing with expansion/contraction of the pair of piezoelectric elements. The pair of piezoelectric elements are placed on the suspension board with circuit such that a first imaginary line extending along an expanding/contracting direction of one of the piezoelectric elements crosses a second imaginary line extending along an expanding/contracting direction of the other piezoelectric element.

In the head gimbal assembly, the pair of piezoelectric elements are placed on the suspension board with circuit such that the first imaginary line extending along the expanding/contracting direction of the one of the piezoelectric elements crosses the second imaginary line extending along the expanding/contracting direction of the other piezoelectric element. Accordingly, by expanding the one of the piezoelectric elements and contracting the other piezoelectric element, it is possible to allow the slider to largely swing in a direction crossing the first and second imaginary lines.

This can allow the position of the magnetic head in the crossing direction to be largely adjusted.

In the head gimbal assembly of the present invention, it is preferable that the slider is located on a bisector of an angle formed between a first line segment extending from a point of intersection of the first and second imaginary lines to the one of the piezoelectric elements and a second line segment extending from the point of intersection to the other piezoelectric element.

In the head gimbal assembly, the slider located on the bisector of the angle formed between the first line segment extending from the point of intersection of the first and second imaginary lines to the one of the piezoelectric elements and the second line segment extending from the point of intersection to the other piezoelectric element. This can allow the slider to swing in both directions from the first and second line segments around the point of intersection in a well-balanced manner.

In the head gimbal assembly of the present invention, it is preferable that the angle formed between the first and second line segments is not more than 90 degrees.

In the head gimbal assembly, the angle formed between the first and second line segments is not more than the specified value. This can allow the slider to swing, while reducing the susceptibility of the suspension board with circuit to design constraints.

In the head gimbal assembly of the present invention, it is preferable that the first and second imaginary lines are inclined so as to be closer to each other toward the slider from the pair of piezoelectric elements.

In the head gimbal assembly, the first and second imaginary lines are closer to each other toward the slider from the pair of piezoelectric elements. Accordingly, the distance between the slider-side end portions of the pair of piezoelectric elements can be reduced to be smaller than in the case where the first and second imaginary lines grow away from each other. As a result, when one of the pair of piezoelectric elements is expanded and the other piezoelectric elements is contracted, it is possible to allow the slider to more largely swing.

In the head gimbal assembly of the present invention, it is preferable that the pair of piezoelectric elements are arranged line-symmetrically with respect to the bisector of the angle formed between the first and second line segments.

In the head gimbal assembly, the pair of piezoelectric elements are arranged line-symmetrically with respect to the bisector of the angle formed between the first and second line segments. Accordingly, by expanding one of the pair of piezoelectric elements and contracting the other piezoelectric element, it is possible to allow the slider to swing in both directions from the first and second line segments around the point of intersection in a well-balanced manner.

In the head gimbal assembly of the present invention, the position of the magnetic head in the crossing direction can largely be adjusted.

BRIEF DESCRIPTION OF THE DRAWINGS

FIG. 6 shows a plan view of a head gimbal assembly in a third embodiment (form in which first and second imaginary lines grow away from each other toward a slider from a pair of piezo-elements) of the present invention; and FIGS. 7A and 7B are plan views each showing a swing of a stage in each of the first and third embodiments, FIG. 7A showing the plan view showing the swing of the stage in the first embodiment, and FIG. 7B showing the plan view showing the swing of the stage in the third embodiment.

DETAILED DESCRIPTION OF THE INVENTION

Configuration of First Embodiment

Figure 1:
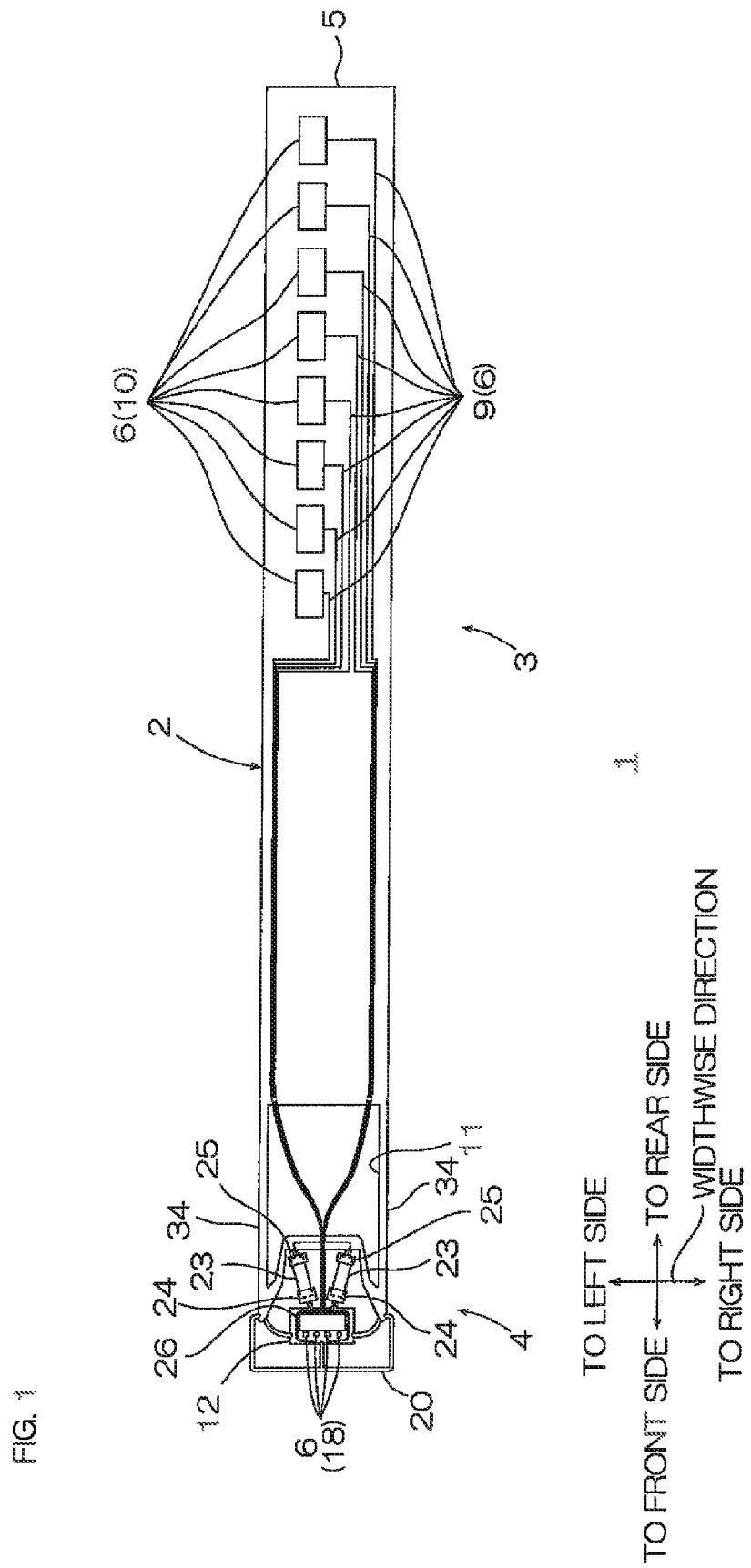
FIG. 1 shows a plan view of a head gimbal assembly in a first embodiment of the present invention.
Figure 2:
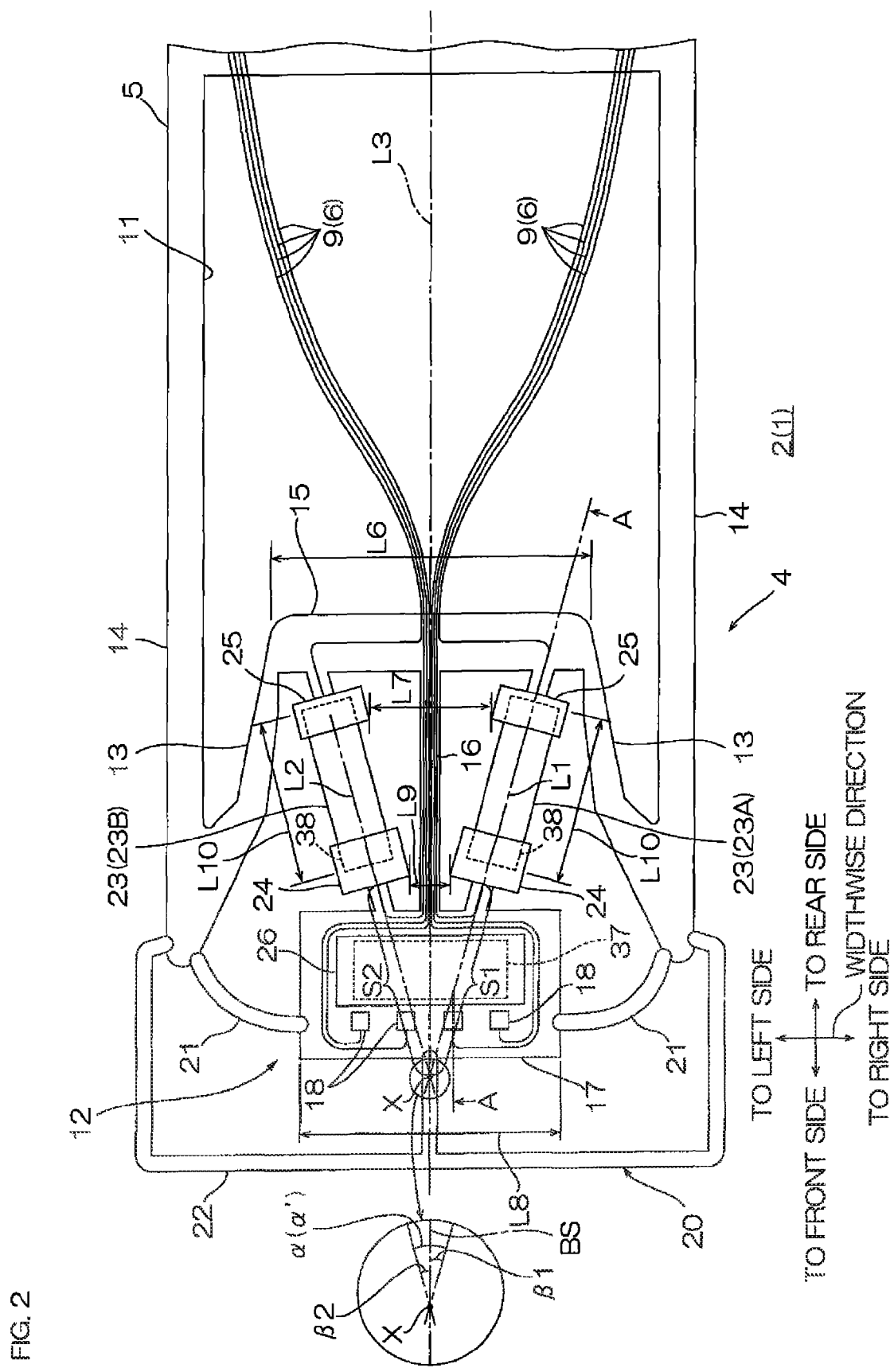
FIG. 2 shows an enlarged plan view of the gimbal portion of the head gimbal assembly shown in FIG. 1.

A head gimbal assembly in a first embodiment of the present invention is described with reference to FIGS. 1 to 4. Note that, in FIG. 1, the left side of the surface of the paper sheet with the drawing is assumed to be a front side (one side in a first direction). The right side of the surface of the paper sheet with the drawing is assumed to be a rear side (the other side in the first direction). The upper side of the surface of the paper sheet with the drawing is assumed to be a left side (one side in a second direction perpendicular to the first direction or one side in a widthwise direction (an example of a crossing direction)). The lower side of the surface of the paper sheet with the drawing is assumed to be a right side (the other side in the second direction or the other side in the widthwise direction). The front side in the thickness direction of the paper sheet with the drawing is assumed to be an upper side (one side in a third direction perpendicular to the first and second directions). The back side in the thickness direction of the paper sheet with the drawing is assumed to be a lower side (the other side in the third direction). The directions in each of the drawings including and subsequent to FIG. 2 are based on the directions in FIG. 1.

Figure 4:
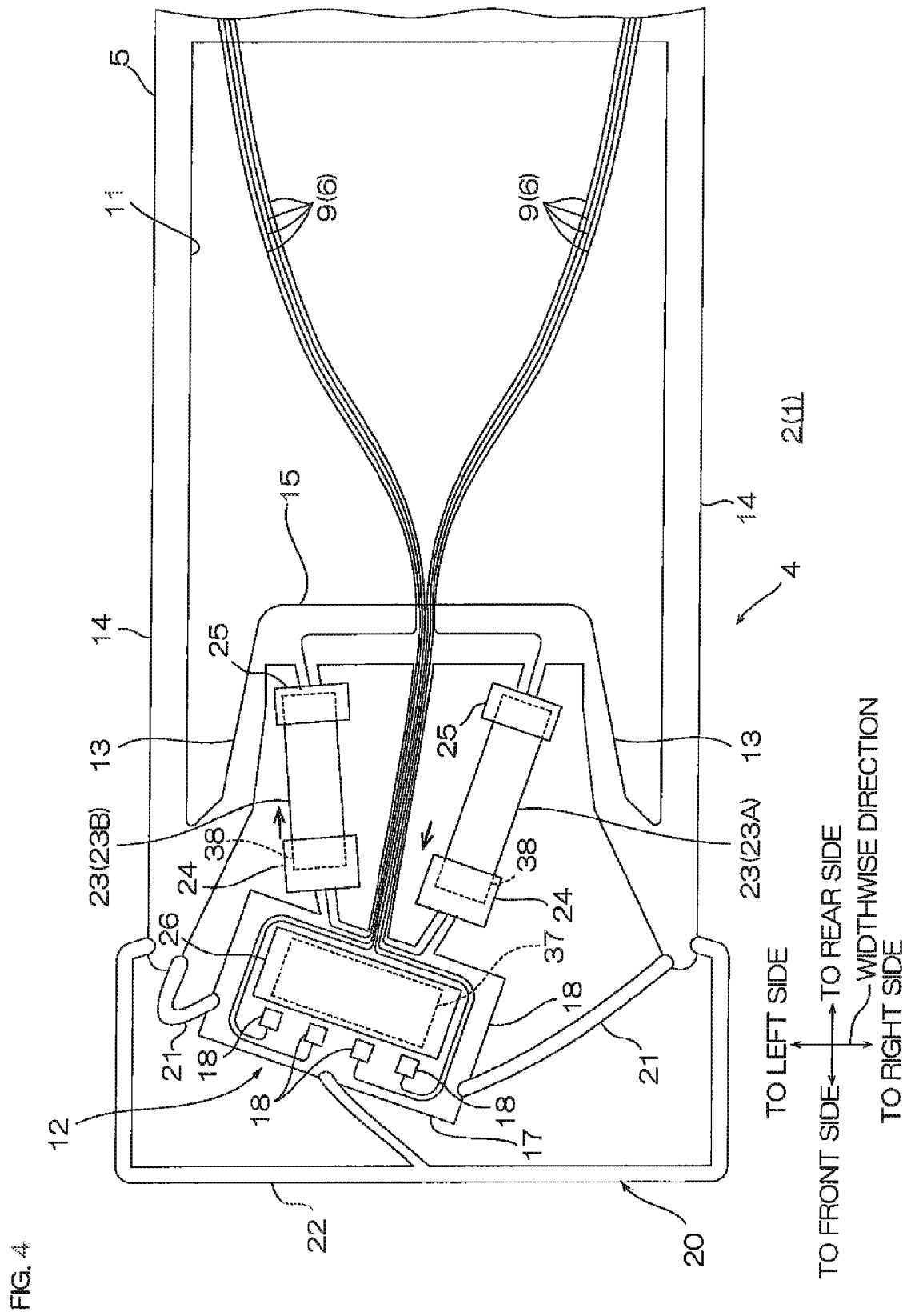
FIG. 4 shows an enlarged plan view of a state in which the stage of the gimbal portion shown in FIG. 2 has been caused to swing.

Note that, in FIGS. 1, 2, and 4, an insulating base layer 7 and an insulating cover layer 8 each described later are omitted to clearly show the relative positioning of a metal supporting board 5, a conductive layer 6, and a slider 26 each described later. In FIGS. 1 and 2, a head gimbal assembly 1 includes a suspension board with circuit 2, a pair of piezo-elements 23 as a pair of piezoelectric elements mounted on the suspension board with circuit 2 to be expandable/contractible, and the slider 26 mounted on the suspension board with circuit 2. The head gimbal assembly 1 is mounted in a hard disk drive (not shown).

In the suspension board with circuit 2, the conductive layer 6 is supported on the metal supporting board 5.

The metal supporting board 5 is formed in a generally rectangular flat belt shape in plan view extending in a front-rear direction (longitudinal direction) and integrally includes a main body portion 3, and a gimbal portion 4 formed on the front side of the main body portion 3.

The main body portion 3 is formed in a generally rectangular shape in plan view.

The gimbal portion 4 is formed so as to extend from the front end of the main body portion 3 to the front side. The gimbal portion 4 is formed with a board opening 11 having a generally rectangular shape in plan view and extending through the gimbal portion 4 in the thickness direction. The gimbal portion 4 includes outrigger portions 14 defined outside the board opening 11 in the widthwise direction (direction perpendicular to the front-rear direction), and a tongue portion 12 coupled to the outrigger portions 14.

The outrigger portions 14 are formed so as to linearly extend from the both widthwise end portions of the main body portion 3 toward the front side.

As shown in FIG. 2, the tongue portion 12 is provided widthwise inside the outrigger portions 14 and coupled to the outrigger portions 14 via first coupling portions 13 extending widthwise inward and obliquely rearward from the front end portions of the outrigger portions 14. The tongue portion 12 is formed in a generally H-shaped shape in plan view and integrally includes a base portion 15 having a generally rectangular shape in plan view extending long in the widthwise direction, a stage 17 having a generally rectangular shape in plan view extending long in the widthwise direction and placed on the front side of the base portion 15 to be spaced apart therefrom, and a middle portion 16 having a generally rectangular shape in plan view extending long in the front-rear direction and connecting the base portion 15 and the widthwise middle portion of the stage 17.

The stage 17 is provided for mounting thereon the slider 26 and connected to the outrigger portions 14 by a flexible second coupling portion 20. The second coupling portion 20 includes curved portions 21 coupling the respective front ends of the outrigger portions 14 to the both widthwise ends of the stage 17, and an E-shaped portion 22 coupling the respective front ends of the outrigger portions 14 to the front end of the stage 17.

The curved portions 21 curvedly extend widthwise inward and obliquely frontward from the respective front ends of the outrigger portions 14 to reach the both widthwise ends of the stage 17.

The &shaped portion 22 has a generally E-shaped shape in plan view. Specifically, the E-shaped portion 22 extends from the front ends of the both outrigger portions 14 toward the front side to subsequently bend widthwise inward. After extending widthwise inward, the portions of the E-shaped portion 22 extending from the front ends of the outrigger portions 14 toward the front side are united and then bent rearward to reach the front end of the stage 17.

The middle portion 16 is formed narrow and bendable in the widthwise direction.

As shown in FIG. 1, the conductive layer 6 includes external-side terminals 10, head-side terminals 18, front-side piezo-terminals 24, rear-side piezo-terminals 25, and wires 9.

The external-side terminals 10 are provided on the rear end portion of the main body portion 3. The plurality of (eight) external-side terminals 10 are disposed to be spaced apart from each other in the front-rear direction.

As shown in FIG. 2, the head-side terminals 18 are provided on the front end portion of the stage 17. The plurality of (four) head-side terminals 18 are disposed to be spaced apart from each other in the widthwise direction.

The front-side piezo-terminals 24 are formed so as to protrude rearward from the rear end edges of the widthwise outer portions of the stage 17. The plurality of (two) front-side piezo-terminals 24 are disposed on both outer sides of the middle portion 16 in the widthwise direction to be spaced apart from each other. Specifically, the front-side piezo-terminals 24 are formed such that wires 9 (described later) on the rear end portion of the stage 17 protrude obliquely rearward and widthwise outward in inclined relation from the rear end edge of the stage 17, while projecting in the widthwise direction. Each of the front-side piezo-terminals 24 has a generally rectangular shape in plan view extending in the longitudinal direction such that the longitudinal direction thereof is gradually inclined widthwise outward toward the rear side. Note that, as is described later, as shown in FIG. 3, around the peripheral end portion of the conductive layer 6 forming each of the front-side piezo-terminals 24, the insulating base layer 7 located under the wires 9 on the rear end portion of the stage 17 is formed continuously in a frame shape in plan view so that the conductive layer 6 is embedded in such a frame of the insulating base layer 7.

As shown in FIG. 2, the rear-side piezo-terminals 25 are formed to correspond to the front-side piezo-terminals 24. Specifically, the plurality of (two) rear-side piezo-terminals 25 are disposed on both outer sides of the middle portion 16 in the widthwise direction to be spaced apart from each other. The plurality of (two) rear-side piezo-terminals 25 are formed so as to protrude from the front end edges of the widthwise outer portions of the base portion 15 toward the front side and disposed to be spaced apart from each other in the widthwise direction. The plurality of rear-side piezo-elements 25 are provided obliquely rearward and widthwise externally of the plurality of respective front-side piezo-terminals 24 to be spaced apart from therefrom. Specifically, the right rear-side piezo-terminal 25 is provided obliquely rearward and rightward of the right front-side piezo-terminal 24 to be spaced apart therefrom. On the other hand, the left rear-side piezo-terminal 25 is provided obliquely rearward and leftward of the left front-side piezo-terminal 24 to be spaced apart therefrom. That is, when the plurality of rear-side piezo-terminals 25 and the plurality of front-side piezo-terminals 24 are projected in the front-rear direction, at least the respective widthwise outer end portions of the plurality of rear-side piezo-terminals 25 are located outside the plurality of front-side piezo-terminals 24. Specifically, when the front-side piezo-terminals 24 and the rear-side piezo-terminals 25 are projected in the front-rear direction, the right end portion of the right rear-side piezo-terminal 25 is located on the right side of the right front-side piezo-terminal 24. On the other hand, the left end portion of the left rear-side piezo-terminal 25 is located on the left side of the left front-side piezo-terminal 24. Each of the rear-side piezo-terminals 25 is formed such that the conductive layer 6 protrudes obliquely frontward and widthwise inward in inclined relation from the front end edge of the base portion 15, while projecting in the widthwise direction. The rear-side piezo-terminal 25 has a generally rectangular shape in plan view extending in the longitudinal direction and is formed such that the longitudinal direction thereof is gradually inclined widthwise outward toward the rear side. Note that, as described later, as shown in FIG. 3, around the peripheral end portion of the conductive layer 6 forming each of the rear-side piezo-terminals 25, the insulating base layer 7 is formed in a frame shape in plan view so that the conductive layer 6 is embedded in such a frame of the insulating base layer 7.

As shown in FIG. 1, the wires 9 are continued to the external-side terminals 10, the head-side terminals 18, the front-side piezo-terminals 24, and the rear-side piezo-terminals 25 to electrically connect the foregoing terminals. The plurality of (ten) wires 9 are formed in the main body portion 3 to be widthwise spaced apart from each other. Specifically, the wires 9 are placed to extend from the external-side terminals 10 toward the front side in the rear end portion of the main body portion 3, bend in the widthwise middle of the main body portion 3, while being divided into two branches, and then extend toward the both widthwise end portions. Then, at the both widthwise end portions, the wires 9 are bent toward the front side to extend along the widthwise outer end edges toward the front end portion of the main body portion 3. In the gimbal portion 4, as shown in FIG. 2, the wires 9 are arranged so as to be converged midway in the base portion 15 in the front-rear direction, while passing over the board opening 11. In the base portion 15, the wires 9 are branched into three parts, specifically the two parts including the respective wires 9 extending toward the both widthwise end portions and the one part including the wires 9 extending toward the front side. Among them, the bunch of (eight) wires 9 extending toward the front side are formed to extend frontward along the middle portion 16, then bend toward the both widthwise end portions in the rear end portion of the stage 17, while being divided into two branches, and then extend along the peripheral end edge of the stage 17. Subsequently, the wires 9 extending toward the front side are turned back to reach the head-side terminals 18 and the front-side piezo-terminals 24. On the other hand, in the base portion 15, the two branched wires 9 extending toward the both widthwise end portions are formed to bend at the widthwise outer end portions of the base portion 15, extend toward the front side, and reach the rear-side piezo-terminals 25.

Figure 3:
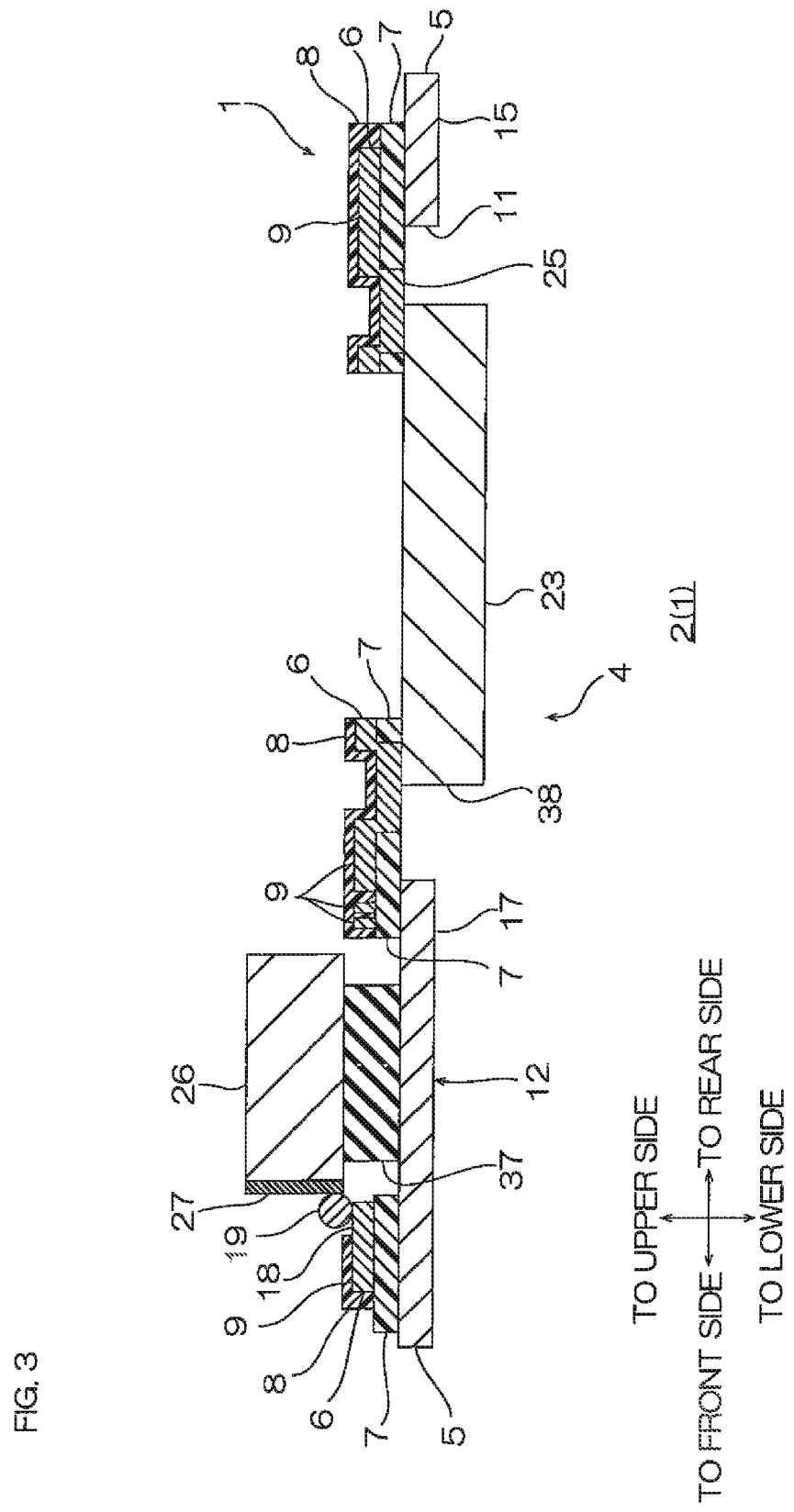
FIG. 3 shows a cross-sectional view of the gimbal portion along the line A-A shown in FIG. 2.

As shown in FIG. 3, the suspension board with circuit 2 includes the metal supporting board 5, the insulating base layer 7 formed on the metal supporting board 5, the conductive layer 6 formed on the insulating base layer 7, and the insulating cover layer 8 formed on the insulating base layer 7 so as to cover the conductive layer 6.

As shown in FIG. 1, the metal supporting board 5 is formed in a shape corresponding to the outer shape of the suspension board with circuit 2. The metal supporting board 5 is formed of a metal material such as, e.g., stainless steel, a 42-alloy, aluminum, a copper-beryllium alloy, or phosphor bronze. Preferably, the metal supporting board 5 is formed of stainless steel. The metal supporting board 5 has a thickness in a range of, e.g., not less than 10 μm, or preferably not less than 15 μm and, e.g., not more than 50 μm, or preferably not more than 35 μm. The base portion 15 has a width (length in a left-right direction) L6 in a range of, e.g., not less than 400 μm, or preferably not less than 500 μm and, e.g., not more than 5000 μm, or preferably not more than 4000 μm. The stage 17 has a width L8 in a range of, e.g., not less than 500 μm, or preferably not less than 600 μm and, e.g., not more than 2000 μm, or preferably not more than 1500 μm.

As shown in FIGS. 1 and 2, the insulating base layer 7 is formed extensively over the main body portion 3 and the gimbal portion 4. As shown in FIG. 3, the insulating base layer 7 is formed to correspond to the portion where the conductive layer 6 is formed. Specifically, the insulating base layer 7 is formed on the metal supporting board 5 in the main body portion 3, while being formed along the wires 9 in the board opening 11 of the gimbal portion 4 and on the middle portion 16 thereof. The insulating base layer 7 is also formed in a generally rectangular frame shape in plan view around the peripheral end portion of each of the front-side piezo-terminals 24 to protrude rearward from the metal supporting board 5 of the stage 17. The insulating base layer 7 is also formed in a generally rectangular frame shape around the peripheral end portion of each of the rear-side piezo-terminals 25 to protrude frontward from the metal supporting board 5 of the base portion 15. As shown in FIG. 2, the insulating base layer 7 forms the second coupling portion 20. The insulating base layer 7 is formed of an insulating material such as a synthetic resin such as, e.g., a polyimide resin, a polyamide imide resin, an acrylic resin, a polyether nitrile resin, a polyether sulfone resin, a polyethylene terephthalate resin, a polyethylene naphthalate resin, or a polyvinyl chloride resin. Preferably, the insulating base layer 7 is formed of a polyimide resin. The insulating base layer 7 has a thickness in a range of, e.g., not less 1 μm, or preferably not less than 3 μm and, e.g., not more than 35 μm, or preferably not more than 15 μm.

As described above, the conductive layer 6 is formed in a conductive pattern including the external-side terminals 10 (FIG. 1), the head-side terminals 18, the front-side piezo-terminals 24, the rear-side piezo-terminals 25, and the wires 9. As shown in FIG. 3, the front-side piezo-terminals 24 and the rear-side piezo-terminals 25 are formed so as to be embedded in the insulating base layer 7 formed in the generally frame shape in plan view. As a result, the lower surfaces of the front-side piezo-terminals 24 and the rear-side piezo-terminals 25 are exposed from the insulating base layer 7 to face downward. The respective lower surfaces of the front-side piezo-terminals 24 and the rear-side piezo-terminals 25 are also formed flush with the lower surface of the insulating base layer 7 formed around the peripheral end portions thereof in each of the widthwise direction and the front-rear direction.

The conductive layer 6 is formed of a conductive material such as, e.g., copper, nickel, gold, a solder, or an alloy thereof. The conductive layer 6 has a thickness in a range of, e.g., not less than 5 μm, or preferably not less than 8 μm and, e.g., not more than 100 μm, or preferably not more than 80 μm. Each of the wires 9 has a width in a range of, e.g., not less than 5 μm, or preferably not less than 8 μm and, e.g., not more than 200 μm, or preferably not more than 100 μm. Each of the external-side terminals 10, the head-side terminals 18, the front-side piezo-terminals 24, and the rear-side piezo-terminals 25 has a width and a length (length in the front-rear direction) in a range of, e.g., not less than 20 μm, or preferably not less than 30 μm and, e.g., not more than 1000 μm, or preferably not more than 800 μm. A distance L7 between the two rear-side piezo-terminals 25 in the widthwise direction is in a range of, e.g., not less than 100 μm, or preferably not less than 200 μm and, e.g., not more than 3000 μm, or preferably not more than 2500 μm. A distance L9 between the two front-side piezo-terminals 24 in the left-right direction is smaller than the distance L7 between the two rear-side piezo-terminals 25 in the widthwise direction and is, e.g., less than 100% and, e.g., not less than 10% of the distance L7. Specifically, the distance L9 is in a range of, e.g., not less than 100 μm, or preferably not less than 200 μm and, e.g., not more than 3000 μm, or preferably not more than 2500 μm.

As shown in FIG. 1, the insulating cover layer 8 is formed extensively over the main body portion 3 and the gimbal portion 4 into a pattern including the conductive layer 6 in plan view, as shown in FIG. 3. Specifically, the insulating cover layer 8 is formed in the pattern covering the respective upper surfaces of the wires 9, the front-side piezo-terminals 24, and the rear-side piezo-terminals 24 and exposing the respective upper surfaces of the external-side terminals 10 (see FIG. 1) and the head-side terminals 18. The insulating cover layer 8 is formed of the same insulating material as the insulating material forming the insulating base layer 7. The insulating cover layer 8 has a thickness in a range of, e.g., not less than 1 μm, or preferably not less than 2 μm and, e.g., not more than 40 μm, or preferably not more than 20 μm.

The suspension board with circuit 2 is produced by a known method which prepares the metal supporting board 5, then provides the insulating base layer 7, the conductive layer 6, and the insulating cover layer 8 in succession, and then forms the board opening 11 in the metal supporting board 5.

As shown in FIG. 2, to the piezo-elements 23, electricity is supplied via the front-side piezo-terminals 24 and the rear-side piezo-terminals 25, and the voltage thereof is controlled. Each of the piezo-elements 23 is formed of, e.g., lead, zinc, titanium, zirconium, or an alloy thereof (composite oxide such as lead zirconate titanate ($Pb(Zr, Ti)O_3$)) so as to be able to expand/contract through such voltage control.

Each of the pair of piezo-elements 23 has a generally rectangular plate shape in plan view extending in the longitudinal direction and is placed such that the longitudinal direction thereof is gradually inclined widthwise inward toward the front side.

The pair of piezo-elements 23 are provided on both widthwise sides of the middle portion 16. Specifically, the pair of piezo-elements 23 include a right piezo-element 23A as one of the piezo-elements provided on the right side of the middle portion 16 and a left piezo-element 23B as the other piezo-element provided on the left side of the middle portion 16. The right piezo-element 23A is mounted over and between the front-side piezo-terminal 24 and the rear-side piezo-terminal 25 which are provided on the right side of the middle portion 16. The left piezo-element 23B is mounted over and between the front-side piezo-terminal 24 and the rear-side piezo-terminal 25 which are provided on the left side of the middle portion 16. Specifically, the respective front and rear end portions of the pair of piezo-elements 23 are electrically connected to the front-side piezo-terminals 24 and the rear-side piezo-terminals 25 and fixed thereto. Thus, the pair of piezo-elements 23 are arranged to extend over and between the front-side piezo-terminals 24 and the rear-side piezo-terminals 25 and form a generally truncated inverted V-shaped shape which is gradually open toward the rear side.

Each of the pair of piezo-elements 23 is provided such that a first imaginary line L1 and a second imaginary line L2 each extending along the expanding/contracting direction thereof are inclined with respect to the front-rear direction. That is, each of the first and second imaginary lines L1 and L2 are inclined with respect to the front-rear direction when projected in the thickness direction. Specifically, the pair of piezo-elements 23 are placed on the suspension board with circuit 2 such that the first and second imaginary lines L1 and L2 cross each other when projected in the thickness direction. That is, the first imaginary line L1 is gradually inclined leftward toward the front side, while the second imaginary line L2 is gradually inclined rightward toward the front side. The first and second imaginary lines L1 and L2 are inclined so as to be closer to each other toward the slider 26 from the pair of piezo-elements 23. Specifically, the first and second imaginary lines L1 and L2 are inclined so as to grow away from each other toward the rear side from a point of intersection X of the first and second imaginary lines L1 and L2. That is, the first and second imaginary lines L1 and L2 are inclined such that a first line segment S1 in the imaginary line L1 extending from the point of intersection X between the first and second imaginary lines L2 to the right piezo-element 23A and a second line segment S2 in the second imaginary line L2 extending from the point of intersection X between the first and second imaginary lines L2 to the left piezo-element 23B form a generally V-shaped shape which is gradually open toward the rear side.

The pair of piezo-elements 23 are placed so as to be line-symmetrical with respect to a bisector BS of an angle α' formed between the first and second line segments S1 and S2.

On the bisector BS mentioned above, the middle portion 16 and the middle portion of the stage 17 are located.

The angle α formed between the first and second line segments S1 and S2 is in a range of, e.g., more than 0 degrees and not less than 5 degrees and, e.g., not more than 120 degrees, preferably not more than 90 degrees (acute angle), more preferably not more than 60 degrees, yet more preferably not more than 45 degrees, or still more preferably not more than 30 degrees. The angle α mentioned above is defined as an angle formed between the first line segment S1 extending to the right piezo-element 23A and the second line segment S2 extending from the point of intersection X to the left piezo-element 23B. When the angle α is not more than the foregoing upper limit, it is possible to reduce the susceptibility of the suspension board with circuit 2 to design constraints. On the other hand, when the angle α is not less than the foregoing lower limit, it is possible to allow the slider 26 to swing sufficiently largely in the widthwise direction.

Note that an angle β1 formed between a reference line L3 extending along the front-rear direction (longitudinal direction) through the middle portion 16 and the first imaginary line L1 is half the angle α mentioned above (i.e., β1=α/2 is satisfied). Also, an angle β2 formed between the reference line L3 and the second imaginary line L2 is half the angle α mentioned above (i.e., β2=α/2 is satisfied).

Each of the pair of piezo-elements 23 has a length L10 in a range of, e.g., not less than 300 μm, or preferably not less than 400 μm and, e.g., not more than 4000 μm, or preferably not more than 3000 μm. The piezo-element 23 has a thickness in a range of, e.g., not less than 10 μm, or preferably not less than 30 μm and, e.g., not more than 100 μm, or preferably not more than 80 μm. The piezo-element 23 has a width in a range of, e.g., not less than 100 μm, or preferably not less than 200 μm and, e.g., not more than 800 μm, or preferably not more than 500 μm.

As shown in FIG. 2, the slider 26 is smaller than the stage 17 and has a generally rectangular shape in plan view having longitudinal direction along the widthwise direction. The slider 26 is mounted at the middle portion of the stage 17 in each of the widthwise direction and the front-rear direction. As shown by the broken line in FIG. 2 and in FIG. 3, the slider 26 has the middle portion thereof bonded to the middle portion of the stage 17 via an adhesive layer 37 made of a known adhesive. The slider 26 is located on the bisector BS and also located on the first and second line segments S1 and S2. Specifically, the slider 26 is located such that the bisector BS passes through the widthwise middle portion thereof. The adhesive layer 37 has a thickness which is, e.g., not less than the total thickness of the insulating base layer 7, the conductive layer 6, and the insulating cover layer 8. In the front end surface of the slider 26, a magnetic head 27 is mounted.

The magnetic head 27 is mounted in the entire front end surface of the slider 26 and formed in a generally box shape extending in a vertical direction. The magnetic head 27 is formed along the plurality of head-side terminals 18. Specifically, as shown in FIG. 3, the magnetic head 27 is formed on the rear side of each of the head-side terminals 18 with a minute space interposed therebetween. This allows the magnetic head 27 to be electrically connected to the head-side terminals 18 using solder balls 19 or the like.

(Swing of Slider)

Next, a swing of the slider 26 with the expansion/contraction of the piezo-elements 23 is described with reference to FIG. 4.

First, to the right piezo-element 23A, electricity is supplied via the front-side piezo-terminal 24 and the rear-side piezo-terminal 25, and the voltage thereof is controlled to expand the right piezo-element 23A. This results in relative departure between the right front-side piezo-terminal 24 and the right rear-side piezo-terminal 25. That is, the right front-side piezo-terminal 24 moves obliquely leftward to the front side.

At the same time, to the left piezo-element 23B, electricity is supplied via the front-side piezo-terminal 24 and the rear-side piezo-terminal 25, and the voltage thereof is controlled to contract the left piezo-element 23B. This results in relative approach between the left front-side piezo-terminal 24 and the left rear-side piezo-terminal 25. That is, the left front-side piezo-terminal 24 moves obliquely leftward to the rear side.

Thus, the left front-side piezo-terminal 24 moves obliquely leftward to the rear side and also the right front-side piezo-terminal 24 moves obliquely leftward to the front side to allow the stage 17 to swing leftward.

Note that, with the swing of the stage 17 described above, the front end of the middle portion 16 and the middle part thereof in the front-rear direction are curved leftward.

On the other hand, when the right piezo-element 23A contracts and the left piezo-element 23B expands, the slider 26 swings rightward.

Function/Effect of First Embodiment

In the head gimbal assembly 1, the pair of piezo-elements 23 are placed over the suspension board with circuit 2 such that the first imaginary line L1 extending along the expanding/contracting direction of the right piezo-element 23A and the second imaginary line L2 extending along the expanding/contracting direction of the left piezo-element 23B cross each other. Therefore, by expanding or contracting the right piezo-element 23A and contracting or expanding the left piezo-element 23B, the slider 26 can be allowed to largely swing in a direction crossing the first and second imaginary lines L1 and L2, i.e., the widthwise direction.

This can allow the widthwise position of the magnetic head 27 to be largely adjusted.

In the head gimbal assembly 1, the slider 26 is located on the bisector 13S of the angle α' formed between the first and second line segments S1 and S2. This can allow the slider 26 to swing in both directions, i.e., both rightward and leftward from the first and second line segment S1 and S2 around the point of intersection X in a well-balanced manner.

In the head gimbal assembly 1, when the angle α' formed between the first and second line segments S1 and S2 is not more than a specified value, it is possible to allow the slider 26 to swing, while reducing the susceptibility of the suspension board with circuit 2 to design constraints.

In the head gimbal assembly 1, the pair of piezo-elements 23 are arranged line-symmetrically with respect to the bisector BS of the angle α' formed between the first and second line segments S1 and S2. Of the pair of piezo-elements 23, the right piezo-element 23A is expanded and the left piezo-element 23B is contracted or the right piezo-element 23A is contracted and the left piezo-element 23B is expanded to be able to allow the slider 26 to swing in both directions, i.e., both rightward and leftward from the first and second line segments S1 and S2 in a well-balanced manner.

Second Embodiment

Figure 5:
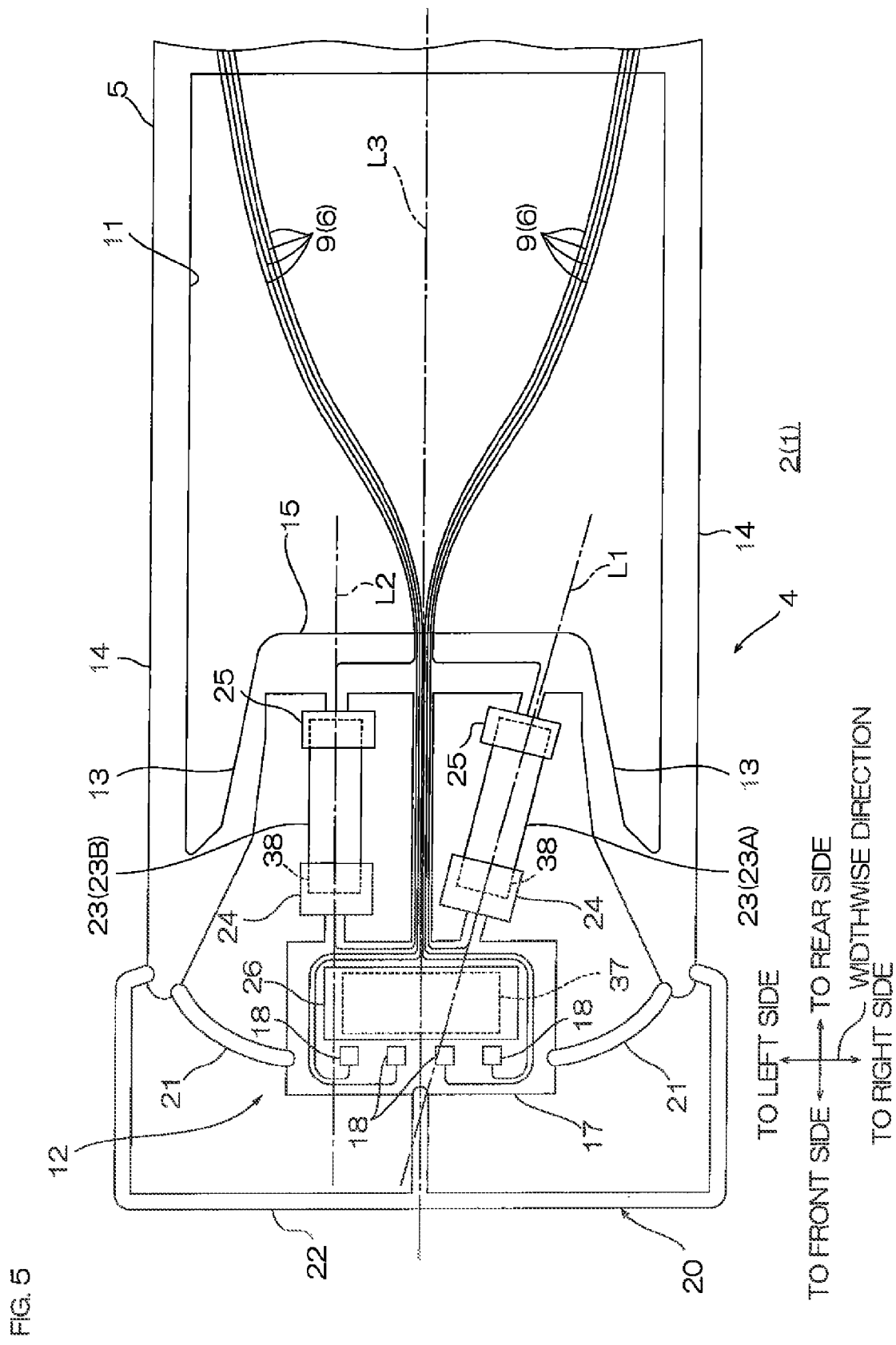
FIG. 5 shows a plan view of the gimbal portion of a head gimbal assembly in a second embodiment (form in which a second imaginary line is parallel with a front-rear direction) of the present invention.

In FIG. 5 showing a second embodiment, the same members and the same steps as in the first embodiment are designated by the same reference numerals and a detailed description thereof is omitted.

In the first embodiment, as shown in FIG. 2, the pair of piezo-elements 23 are provided in the head gimbal assembly 1 so as to incline each of the first and second imaginary lines L1 and L2 with respect to the front-rear direction. However, as shown in, e.g., FIG. 5, it is also possible to place only one of the pair of piezo-elements 23, e.g., the right piezo-element 23A such that a line passing through the right piezo-element 23A is gradually inclined widthwise inward (leftward) toward the front side and thus incline only the first imaginary line L1 with respect to the front-rear direction. On the other hand, it is also possible to place the left piezo-element 23B such that a line passing through the left piezo-element 23B extends along the front-rear direction and thus place the left piezo-element 23B such that the second imaginary line L2 is parallel with the reference line L3 (specifically, the second imaginary line L2 does not cross the reference line L3).

The second embodiment can achieve the same function/effect as achieved by the first embodiment.

Third Embodiment

In FIGS. 6 and 7 showing a third embodiment, the same members and the same steps as in the first embodiment are designated by the same reference numerals and a detailed description thereof is omitted.

In the first embodiment, as shown in FIG. 2, the first and second imaginary lines L1 and L2 are inclined so as to be closer to each other toward the slider 26 from the pair of piezo-elements 23. However, as shown in, e.g., FIG. 6, the first and second imaginary lines L1 and L2 can also be inclined so as to grow away from each other toward the slider 26 from the pair of piezo-elements 23.

Specifically, the first and second imaginary lines L1 and L2 are inclined so as to grow away from each other toward the front side from the point of intersection X. That is, the first and second line segments S1 and S2 form a generally V-shaped shape which is gradually widely open toward the front side from the point of intersection X.

In the first embodiment, it is possible to allow the stage 17 to more largely swing than in the third embodiment. As shown in FIG. 2, according to the first embodiment, the first and second imaginary lines L1 and L2 are closer to each other toward the slider 26 from the pair of piezo-elements 23. Accordingly, the distance between respective front end portions (slider-side terminal portions) 38 of the pair of piezo-elements 23 can be reduced to be smaller than in the third embodiment shown in FIG. 6 in which the first and second imaginary lines L1 and L2 grow away from each other. As a result, when the right piezo-element 23A of the pair of piezo-elements 23 is expanded and the left piezo-element 23B of the pair of piezo-elements 23 is contracted as shown in FIG. 7A, it is possible to allow the slider 26 to more largely swing leftward than when the pair of piezo-elements 23 in the third embodiment are expanded/contracted to the same degree as in the first embodiment shown in FIG. 7B.

A rightward swing of the slider 26 is also the same as the leftward swing of the slider 26. In the first embodiment, it is possible to allow the slider 26 to more largely swing than in the third embodiment.

On the other hand, in the third embodiment, it is possible to allow the slider 26 to less largely swing than in the first embodiment. This can allow the slider 26 to more precisely swing. As a result, it is possible to accurately (finely) adjust the magnetic head 27.

EXAMPLES

Numerical values in Examples shown below can be replaced with the values (i.e., upper limit values or lower limit values) shown in the embodiments described above.

Example 1

As shown in FIGS. 1 to 3, the suspension board with circuit 2 including the metal supporting board 5, the insulating base layer 7, the conductive film 6, and the insulating cover layer 8 each described below was prepared.

Metal Supporting Board 5
Material: Stainless steel
Thickness: 18 μm
Width L6 in base portion 15: 3800 μm
Width L8 in stage 17: 800 μm
Insulating Base Layer 7
Material: Polyimide
Thickness: 10 μm
Conductive Layer 6
Distance L7 between two rear-side piezo-terminals 25: 1800 μm
Distance L9 between two front-side piezo-terminals 24: 1000 μm
Material: Copper
Thickness: 9 μm
Insulating Cover Layer 8
Material: Polyimide
Thickness: 4 μm Then, the pair of piezo-elements 23 each having the following dimensions were electrically connected to the front-side piezo-terminals 24 and the rear-side piezo-terminals 25 such that the first and second imaginary lines L1 and L2 cross each other.

Piezo-Element 23
Length L10: 1155 μm
Thickness: 50 μm
Width: 330 μm
Angle α: 30 degrees
Angle β1: 15 degrees
Angle β2: 15 degrees Then, the slider 26 on which the magnetic head 27 was mounted was fixed to the middle portion of the stage 17 via the adhesive layer 37.

In this manner, the head gimbal assembly 1 including the suspension board with circuit 2, the piezo-elements 23, and the slider 26 was produced.

Then, to the pair of piezo-elements 23, electricity was supplied via the front-side piezo-terminals 24 and the rear-side piezo-terminals 25. The voltage of the electricity was controlled to expand the right piezo-element 23A and contract the left piezo-element 23B. In this manner, the slider 26 was allowed to swing leftward. At this time, the amount of displacement of the magnetic head 27 was measured. The result of the measurement is shown in Table 1.

TABLE 1

|  | Angle α (Degrees) | Angle β1 Angle β2 (Degrees) | Amount of Leftward Displacement of Magnetic Head 27 (nm) |
| --- | --- | --- | --- |
| Example 1 | 30 | 15 | 342 |
| Example 2 | 60 | 30 | 318 |
| Example 3 | 90 | 45 | 307 |
| Comparative Example 1 | 0 | 0 | 292 |

Examples 2 and 3 and Comparative Example 1

The head gimbal assemblies 1 were produced in the same manner as in Example 1 except that the angle α described above was changed to the values shown in Table 1. Subsequently, the sliders 26 were caused to swing leftward and the amounts of displacement of the magnetic heads 27 were measured. The result of the measurement is shown in Table 1.

While the illustrative embodiments of the present invention are provided in the above description, such is for illustrative purpose only and it is not to be construed limitative. Modification and variation of the present invention which will be obvious to those skilled in the art is to be covered by the following claims.

What is claimed is:

1. A head gimbal assembly, comprising:
a suspension board with circuit;
a pair of piezoelectric elements mounted on the suspension board with circuit to be expandable/contractible; and
a slider on which a magnetic head is mounted and which is mounted on the suspension board with circuit and configured to be able to swing with expansion/contraction of the pair of piezoelectric elements,
wherein the pair of piezoelectric elements are placed on the suspension board with circuit such that a first imaginary line extending along an expanding/contracting direction of one of the piezoelectric elements crosses a second imaginary line extending along an expanding/contracting direction of the other piezoelectric element, and
wherein the slider is located on a bisector of an angle formed between a first line segment extending from a point of intersection of the first and second imaginary lines to the one of the piezoelectric elements and a second line segment extending from the point of intersection to the other piezoelectric element.

2. A head gimbal assembly according to claim 1, wherein the angle formed between the first and second line segments is not more than 90 degrees.

3. A head gimbal assembly according to claim 1, wherein the first and second imaginary lines are inclined so as to be closer to each other toward the slider from the pair of piezoelectric elements.

4. A head gimbal assembly according to claim 1, wherein the pair of piezoelectric elements are arranged line-symmetrically with respect to the bisector of the angle formed between the first and second line segments.

5. A head gimbal assembly according to claim 1, wherein the slider is also located on the first line segment and the second line segment.

6. A head gimbal assembly according to claim 1, wherein only one of the pair of piezoelectric elements is inclined, such that only one of the first and second imaginary lines is inclined with respect to a front-rear direction of the suspension board with circuit.

7. A head gimbal assembly according to claim 1, wherein the first and second imaginary lines are inclined so as to grow away from each other toward the slider from the point of intersection.

* * * * *